J. W. Still,
Gate Latch.

No. 86,601.  Patented Feb. 2, 1869.

Witnesses
Geo. H. Strong
Jno. L. Boone

Inventor:
John W. Still
per Dewey & Co
attorney

JOHN W. STILL, OF SAN FRANCISCO, CALIFORNIA.

Letters Patent No. 86,601, dated February 2, 1869.

IMPROVEMENT IN GATE-LATCHES

The Schedule referred to in these Letters Patent and making part of the same.

*To all whom it may concern:*

Be it known that I, JOHN W. STILL, of the city and county of San Francisco, State of California, have invented an Improved Gate-Latch; and I do hereby declare the following description and accompanying drawings are sufficient to enable any person skilled in the art or science to which it most nearly appertains, to make and use my said invention or improvements without further invention or experiment.

The object of my invention is to provide an improved gate-latch, so constructed that it may be easily and readily operated from either side of the gate, while it cannot be opened by being pushed against by cattle and hogs; and It consists in attaching to the gate a latch, in the form of a hook, having a suitable place arranged, in which the fingers may be placed, to draw back the hook, in order to unlatch the gate.

The hook is attached to the gate so as to leave a connecting-spring between it and the attachment, and an inclined slot is cut in the gate beneath the spring, to allow the hook to be drawn back.

The gate-post is cut away, so as to allow a metal plate to be set at an incline, the end of which protrudes beyond the slot, so as to furnish a catch for the hook.

To more fully illustrate my invention, reference is had to the accompanying drawings, forming a part of this specification, of which—

Figure 1:
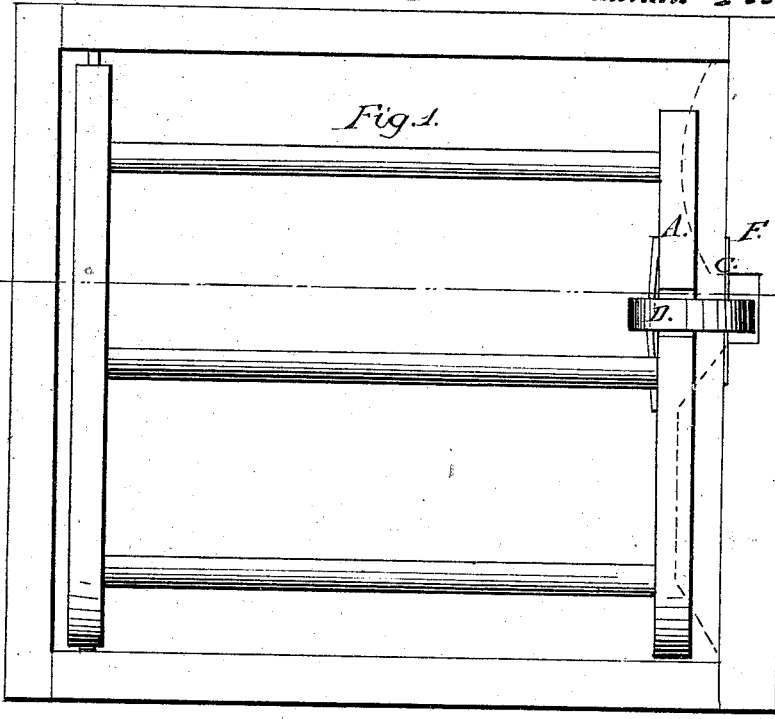
Figure 2:
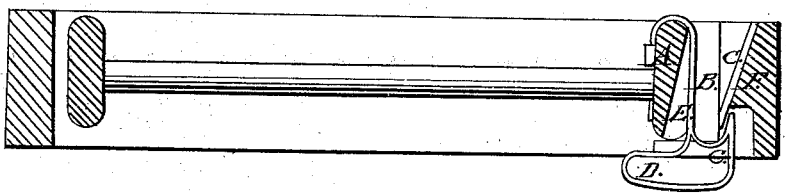
Figure 3:
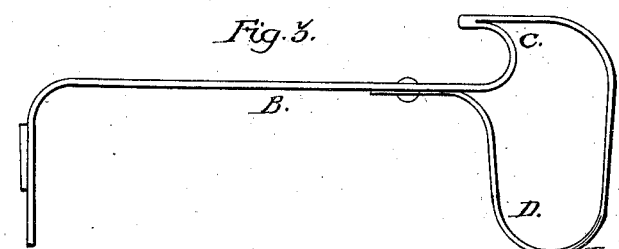

Figure 1 is a side view of the gate.
Figure 2 is a sectional view, taken through x x.
Figure 3 is an enlarged view of the latch.

A is the frame of a gate, to which are attached, by means of screws, the spring B and hook C, which are made of the same piece of metal, by forming the hook at the end of the spring, and bending the remaining portion of the metal, so as to form a catch or hand-hold, D, as shown in fig. 3.

An incline slot, E, is cut in the frame of the gate, directly under the spring, to allow of its being drawn back, for the purpose of disengaging the hook.

The gate-post F is cut away, so as to allow a plate of metal, G, to be firmly secured at an incline, which crowds the hook back, when closing the gate, until it passes the plate G, when the spring causes the hook to catch over the end of the plate, the wood being cut away at that point, to allow the hook to enter.

To open the gate, it is first pushed back far enough to allow the hook to clear the catch, when, by inserting the fingers in the hand-hold, the hook is drawn out, so as to allow the gate to swing open.

By this arrangement, I have a gate which is easily operated, and one which is secure, when closed, from the attempts of animals to open it.

Having thus described my invention,

What I claim, and desire to secure by Letters Patent, is—

The spring B, hook C, handle D, and plate or catch G, combined and arranged to form a gate or door-fastening, substantially as herein described.

In witness whereof, I have hereunto set my hand and seal.

JOHN W. STILL. [L. S.]

Witnesses:
J. L. BOONE,
GEO. H. STRONG.